United States Patent
Cayre et al.

(10) Patent No.: US 10,209,976 B2
(45) Date of Patent: Feb. 19, 2019

(54) AUTOMATED APPLICATION INSTALLATION

(71) Applicant: Dropbox, Inc., San Francisco, CA (US)

(72) Inventors: Stefano Cayre, San Francisco, CA (US); Jacob Hurwitz, San Francisco, CA (US); Darius Contractor, San Francisco, CA (US); Yuran Lu, San Francisco, CA (US); James Harvey, San Francisco, CA (US); Aadil Sarfani, San Francisco, CA (US); Huy Nguyen, Foster City, CA (US); Alexander Embiricos, San Francisco, CA (US); Genevieve Sheehan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 43 days.

(21) Appl. No.: 14/983,959

(22) Filed: Dec. 30, 2015

(65) Prior Publication Data
US 2017/0192764 A1    Jul. 6, 2017

(51) Int. Cl.
  *G06F 8/61* (2018.01)
  *H04L 29/06* (2006.01)
  *H04L 29/08* (2006.01)

(52) U.S. Cl.
  CPC ............ *G06F 8/61* (2013.01); *H04L 63/0884* (2013.01); *H04L 67/34* (2013.01)

(58) Field of Classification Search
  CPC ........ G06F 8/61; H04L 63/0884; H04L 67/34
  USPC .................................................. 717/168–178
  See application file for complete search history.

(56) References Cited

U.S. PATENT DOCUMENTS

| | | | |
|---|---|---|---|
| 6,301,666 B1 * | 10/2001 | Rive ..................... | G06F 3/0622 707/999.009 |
| 7,055,040 B2 | 5/2006 | Klemba et al. | |
| 7,305,090 B1 | 12/2007 | Hayes et al. | |
| 7,958,193 B2 * | 6/2011 | Augustine .............. | G06Q 10/10 709/205 |
| 8,107,927 B2 | 1/2012 | Sivaram et al. | |

(Continued)

OTHER PUBLICATIONS

Paypal Developer, "CreateAccount API Operation", PayPal, Inc., San Jose, CA (Retrieved on Apr. 4, 2016 from https://developer.paypal.com/docs/classic/api/adaptive-accounts/CreateAccount_API_Operation/).

(Continued)

*Primary Examiner* — Andrew M. Lyons
(74) *Attorney, Agent, or Firm* — Polsinelli PC

(57) ABSTRACT

An example computer implemented method to automatically download and install a second application can include a first application detecting that a condition has occurred. This first application can be preinstalled by the original equipment manufacturer. The first application can then present an interface for signing in to or signing up for a service. The first application can then download and install the second application. This downloading and installation can occur in the background without requiring user interaction. The second application can be a client application for the service and the first application can pass a token with login credentials to the second application. This can allow the second application to be authenticated with the service without requiring a user to reenter the user's credentials.

19 Claims, 6 Drawing Sheets

(56) References Cited

U.S. PATENT DOCUMENTS

| | | | |
|---|---|---|---|
| 8,640,213 B2* | 1/2014 | Najafi | G06F 21/31 455/411 |
| 8,650,558 B2 | 2/2014 | DePoy | |
| 8,701,173 B2* | 4/2014 | Hall | H04L 63/0807 709/219 |
| 8,750,574 B2 | 6/2014 | Ganong | G06F 17/30247 382/115 |
| 8,825,597 B1* | 9/2014 | Houston | H04L 67/06 707/610 |
| 8,855,605 B2 | 10/2014 | Nielsen et al. | |
| 8,856,502 B2 | 10/2014 | Barrus et al. | |
| 9,047,156 B2 | 6/2015 | Ernst et al. | |
| 9,092,291 B1* | 7/2015 | Adib | G06F 8/61 |
| 9,122,861 B2* | 9/2015 | Schwesig | G06F 21/36 |
| 9,276,914 B2 | 3/2016 | Woodward | |
| 9,513,888 B1* | 12/2016 | Fultz | H04W 4/60 |
| 2002/0143896 A1* | 10/2002 | Hansmann | G06F 17/30902 709/218 |
| 2002/0147685 A1 | 10/2002 | Kwan | |
| 2003/0084096 A1* | 5/2003 | Starbuck | G06F 17/3089 709/203 |
| 2003/0236799 A1* | 12/2003 | Keohane | G06F 8/62 |
| 2004/0128136 A1 | 7/2004 | Irani | |
| 2006/0059174 A1* | 3/2006 | Mese | G06F 9/445 |
| 2007/0186106 A1* | 8/2007 | Ting | H04L 63/0815 713/168 |
| 2007/0260988 A1* | 11/2007 | Miller | H04N 5/44513 715/744 |
| 2007/0299941 A1 | 12/2007 | Hietasarka et al. | |
| 2008/0010361 A1* | 1/2008 | Jacobs | H04L 67/125 709/218 |
| 2009/0008445 A1 | 1/2009 | Chen et al. | |
| 2009/0228404 A1 | 9/2009 | Elam et al. | |
| 2009/0280796 A1 | 11/2009 | Macaluso et al. | |
| 2009/0288079 A1 | 11/2009 | Zuber et al. | |
| 2010/0095357 A1 | 4/2010 | Willis et al. | |
| 2010/0211796 A1* | 8/2010 | Gailey | G06F 21/31 713/182 |
| 2010/0235476 A1* | 9/2010 | Lin | H04L 61/2015 709/219 |
| 2010/0323664 A1 | 12/2010 | Sivaram et al. | |
| 2011/0138445 A1* | 6/2011 | Chasen | G06F 21/10 726/3 |
| 2011/0219429 A1 | 9/2011 | Lee et al. | |
| 2012/0144382 A1 | 6/2012 | Matthew et al. | |
| 2012/0185398 A1 | 7/2012 | Weis et al. | |
| 2012/0239693 A1* | 9/2012 | Averett | G06F 8/60 707/770 |
| 2012/0309353 A1 | 12/2012 | Markov et al. | |
| 2012/0331527 A1 | 12/2012 | Walters | |
| 2013/0019234 A1* | 1/2013 | Pardehpoosh | G06F 21/121 717/170 |
| 2013/0019237 A1* | 1/2013 | Pardehpoosh | G06Q 30/0609 717/171 |
| 2013/0139235 A1 | 5/2013 | Counterman | |
| 2013/0145138 A1* | 6/2013 | Kyprianou | G06F 15/177 713/1 |
| 2013/0179256 A1* | 7/2013 | Farrell | G06Q 30/02 705/14.49 |
| 2013/0191926 A1 | 7/2013 | Chow et al. | |
| 2013/0283298 A1 | 10/2013 | Ali et al. | |
| 2013/0339937 A1* | 12/2013 | Meggison, Sr. | G06F 8/62 717/168 |
| 2013/0340053 A1* | 12/2013 | McCoy | G06F 21/31 726/5 |
| 2014/0012714 A1* | 1/2014 | Feldman | G06Q 30/0641 705/27.1 |
| 2014/0066023 A1 | 3/2014 | Purdy | |
| 2014/0082363 A1 | 3/2014 | Lee et al. | |
| 2014/0122204 A1* | 5/2014 | Hills | G06Q 30/0222 705/14.23 |
| 2014/0122217 A1* | 5/2014 | Hills | G06Q 30/0239 705/14.39 |
| 2014/0123314 A1* | 5/2014 | Hills | G06F 21/41 726/28 |
| 2014/0173590 A1 | 6/2014 | Ein-Gal et al. | |
| 2014/0223527 A1* | 8/2014 | Bortz | H04L 63/08 726/6 |
| 2014/0250433 A1* | 9/2014 | Stekkelpak | G06F 9/44505 717/176 |
| 2014/0323094 A1 | 10/2014 | Luoma et al. | |
| 2015/0113093 A1* | 4/2015 | Brunswig | H04L 67/2842 709/216 |
| 2015/0193215 A1* | 7/2015 | Jianu | G06F 8/61 717/177 |
| 2015/0222615 A1* | 8/2015 | Allain | H04L 63/08 726/4 |
| 2015/0363141 A1 | 12/2015 | Fernandes et al. | |
| 2015/0378709 A1* | 12/2015 | D'Amico | H04W 4/001 717/176 |
| 2016/0156613 A1* | 6/2016 | McCoy | G06F 21/31 726/7 |
| 2016/0182479 A1* | 6/2016 | Kaplan | H04L 51/046 726/6 |
| 2016/0334970 A1* | 11/2016 | Mysore Veera | G06F 9/445 |
| 2017/0085445 A1* | 3/2017 | Layman | H04L 43/045 |

OTHER PUBLICATIONS

"HipChat API Reference: users/create", Atlassians, Sydney, Australia. (Retrieved on Mar. 29, 2016 from https://www.hipchat.com/docs/api/method/users/create).

* cited by examiner

AUTOMATED APPLICATION INSTALLATION

BACKGROUND

Many original equipment manufacturers (OEMs) of computers preinstall software onto the computers they sell. The combination of internal testing by the OEM, production time, and time that the computer sits on shelves awaiting purchase all contribute to a significant delay from when the software is provided to the OEM to when a user finally runs the software after purchase of the computer. This delay can be many months and can result in the version ultimately run by the user being significantly outdated. This is undesirable because outdated software can have security vulnerabilities, limited or obsolete functionality, incompatibility with up-to-date systems, etc. Informing a user that their new computer is out-of-date can be undesirable; further, the software may appear broken to the user. These limitations can leave a negative impression on the user, which counteracts a purpose of preinstalled software—to promote the software or an associated service.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically downloading and installing an application.

An example computer implemented method to automatically download and install a second application can include a first application detecting that a condition has occurred. This first application can be preinstalled by the original equipment manufacturer. The first application can then present an interface for signing in to or signing up for a service. The first application can then download and install the second application. This downloading and installation can occur in the background without requiring user interaction. The second application can be a client application for the service and the first application can pass a token with login credentials to the second application. This can allow the second application to be authenticated with the service without requiring a user to reenter the user's credentials.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for downloading and installing an application using another application that was preinstalled by an original equipment manufacturer.

Figure 1:
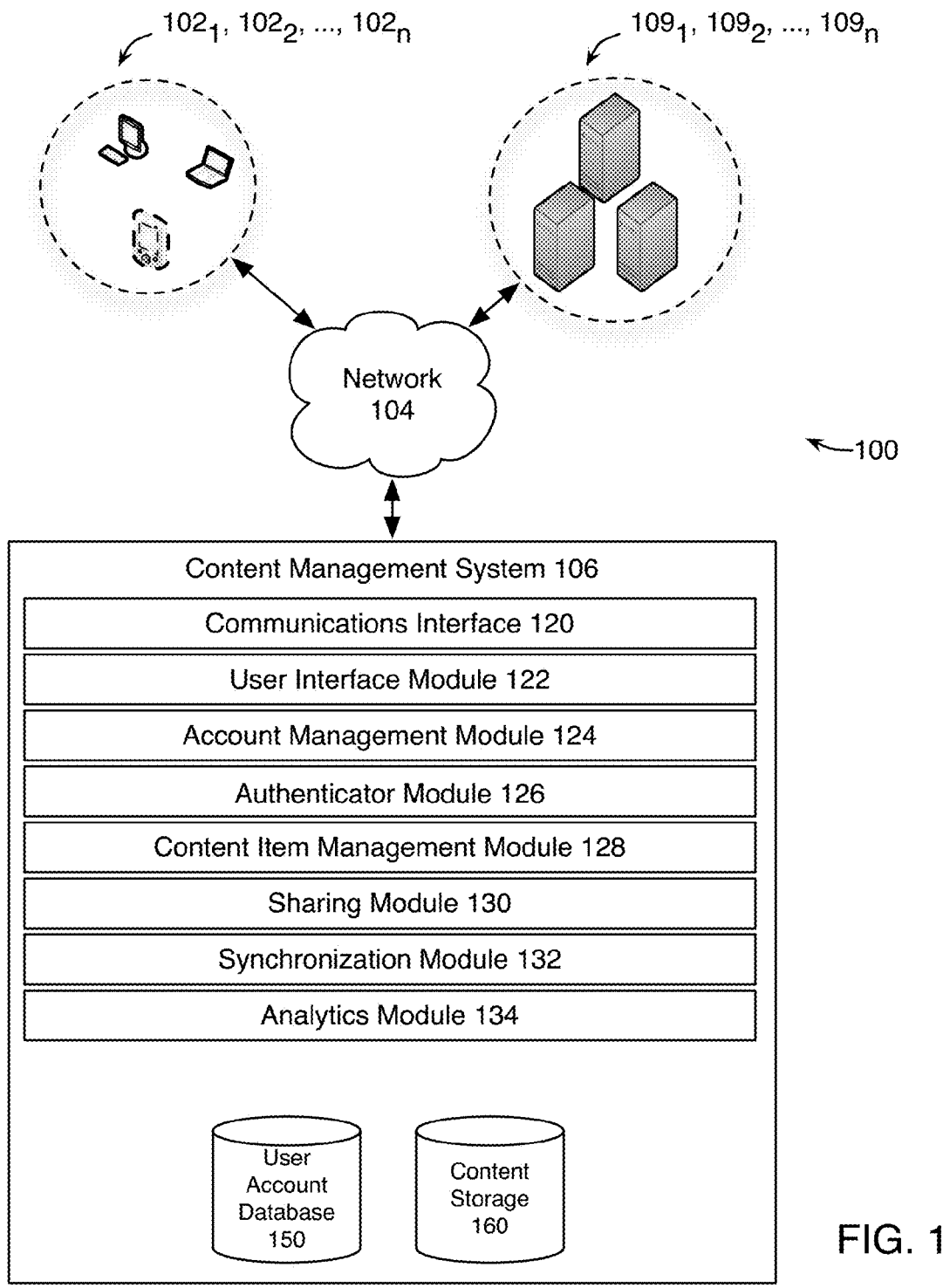
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ... , $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104, and the same client device $102_i$ or some other client device $102_j$, can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$, can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
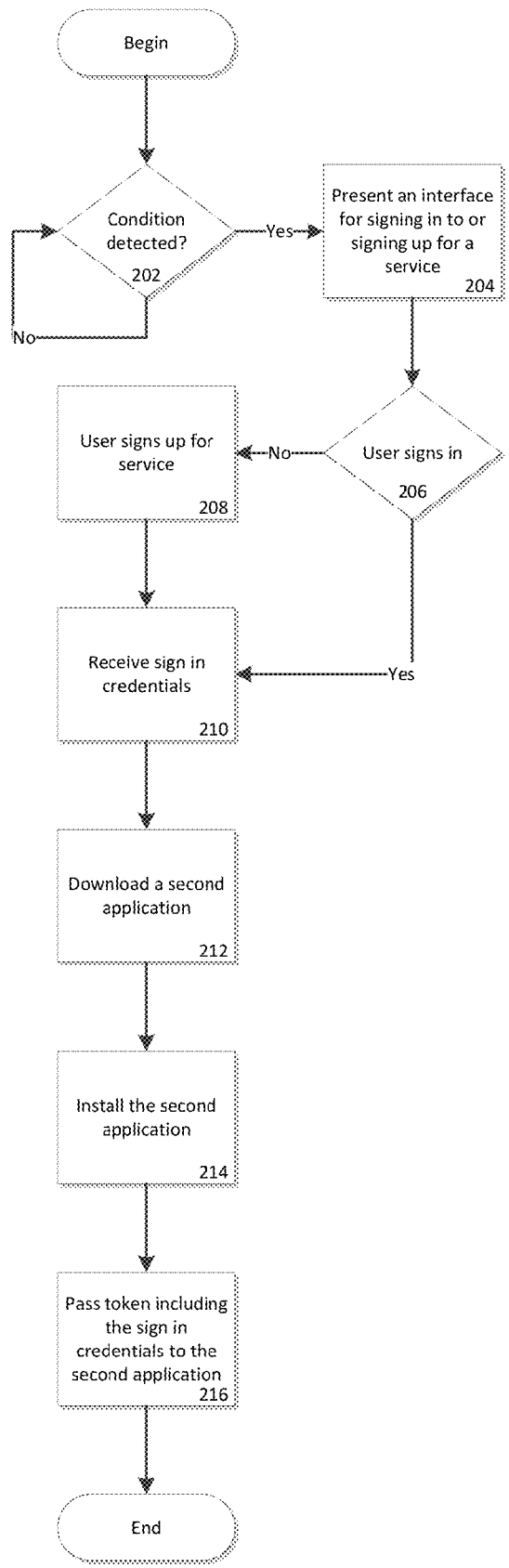
FIG. 2 shows an example process in accordance with some embodiments.

FIG. 2 shows an example process according to some embodiments. The process can be run by a first application. The example process is typically executed by a client device such as client device 102. The process can begin with detecting a condition (step 202). If the condition is not detected, step 202 can loop until the condition is ultimately detected. The condition can be content item being saved, a screenshot being captured, an event related to a content item manager (e.g., a file system opening for the first time, saving a content item, updating a content item, searching for a content item, sharing a content item, etc.), a period of time (e.g., a number of minutes, hours, or days), after a system event such as the computer first booting up, a prompt being displayed for a user to login to various accounts (e.g., social media, email, cloud synchronization, etc.), connecting to network 104, sending an email, opening an attachment, connecting a portable device, etc. In some embodiments, multiple conditions are independently or jointly effective to satisfy step 202.

In some embodiments, the OEM has strict guidelines about when an application can run and how much processing time it can consume if the application runs during boot. Waiting for a condition that will be satisfied after boot is completed permits the application to accommodate such requirements.

When the condition is detected (step 202), the process can continue and present an interface for signing in to or signing up for a service (step 204). This interface can include a dialog box, an alert, a web site, etc. The process can then determine if the user signs in (step 206).

If the user does not sign in ("no" at step 206), the user can be guided to sign up for the service (step 208). After the user does sign in ("yes" at step 206) or after the user signs up for the service (step 208), the process can receive sign in credentials (step 210). The sign in credentials can be a username and password, an encrypted form of the username and/or password, a unique authentication key for the module running the process (e.g., using OAuth standard), an authentication key containing an expiration date (e.g., the key will only last for a few seconds or minutes). The sign in credentials can be received directly from the user or from the service. For example, the user can enter in the user's credentials into the service and the service can send credentials to the application running the process.

The process can then include downloading a second application (step 212). This step can be in response to receiving user credentials or can be running simultaneous to other steps. In some embodiments, step 212 is performed in anticipation of the condition occurring or in response to the condition being detected. The second application can be related to the first application. For example, the first application can be a registration module running on client device 102. The first application can be associated with content management system 106 and the second application can be a client synchronization application that is also associated with content management system 106. In some embodiments, the first application downloads the most up-to-date version of the second application. This can ensure that the version of the second application that a user first experiences is up to date. In some embodiments, the process can include connecting to a download server that can inform the first application of how to download the most recent version of the client synchronization application.

The process can then include installing the second application (step 214). In some embodiments, this download and installation (steps 212 and 214) can occur in the background without notifying the user. For example, these steps can occur while the user is signing in or signing up for the service. In some embodiments, these steps occur in anticipation of the condition in step 202 being detected. In some embodiments, the first application can have elevated access privileges to enable the installation of the second application without user involvement (e.g., not triggering a user access control prompt by an operating system).

The process can continue by passing a token including the sign in credentials from the first application to the second application (step 216). The token can be effective to automatically sign into the service by the second application. In some embodiments, this can include entering the sign in credentials previously entered in the first application into the second application. In some embodiments, this can include passing a cookie (or similar) for use by the second application. In some embodiments, step 216 includes negotiating sign in credentials specific to the second application. For example, the first application can request a unique identifier (e.g., a pseudo-random number) from the second application which it can send to content management system 106; content management system 106 can then send a unique sign in credential to the first application which can be passed to the second application. Alternatively, the first application can send a unique identifier associated with the second application to content management system 106; content management system 106 can then validate the unique identifier so that the second application can then connect to content management system 106 using the unique identifier. Passing the token to the second application (step 216) can be part of the installation procedure or can be another procedure.

Figure 3:
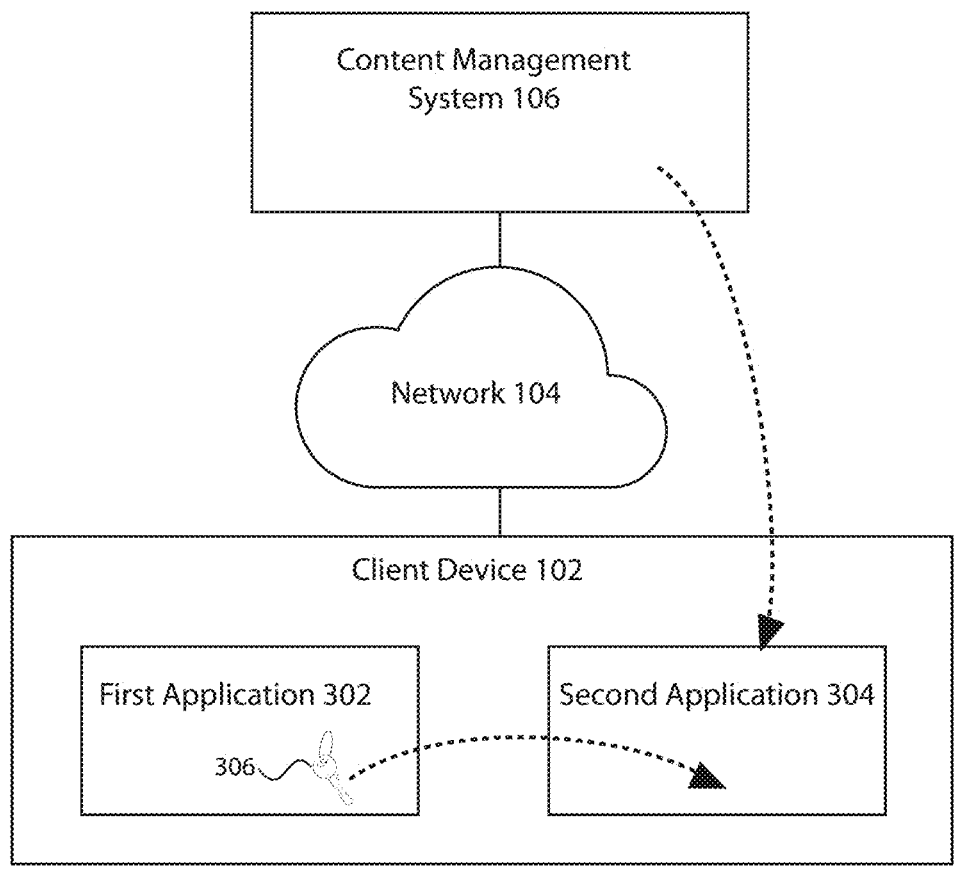
FIG. 3 shows an example configuration of devices according to various embodiments.

FIG. 3 illustrates an example of the first application passing credentials or a token to the second application. In some embodiments, second application 304 requests the token from the first application 302. In some embodiments, the second application requires sign in credentials to run. For example, the second application cannot complete an installation procedure without having sign in credentials. In some such embodiments, it is impossible to preinstall the second application as it would have to be installed without sign in credentials. Thus, in some embodiments, the first application can hint at various features of second application without actually incorporating such features. For example, the first application can implement a "share with" option, suggesting that a user can share a content item using the service. However, because such functionality can be incomplete with the first application, when a user selects to share the content item using the service (e.g., step 202), the first application can continue at step 204 of the process.

When the second application runs, it can use the token to synchronize content items with content management system 106. For example, second application can initiate an encrypted and authenticated synchronization session with content management system 106 using the supplied credentials.

In some embodiments, the first application is uninstalled after or during the installation of the second application. For example, the second application can remove the first application or the first application can remove itself. This can save space on a client device. Because the first application can contain promotional content (e.g., invitations to sign up for the service), it can be beneficial to prevent the first application from displaying the promotional content after a user has signed in or signed up for the service. For example, this can include deactivating or removing operating system "hooks" or deactivating or removing the first application.

In some embodiments, the first application can remain after the second application finishes installing. The first application can then manage the state of the second application and can apply updates to the second application as updates become available. If a user wishes to remove the second application, in some embodiments the user can utilize the first application to uninstall the second application. In some embodiments, multiple instances of the second application can be installed on client device 102; in some such embodiments, the first application can manage each installation. For example, a user might have one installation associated with a personal account and another installation associated with a business account.

FIG. 3 also shows an example configuration of devices according to various embodiments. As described above, content management system 106 can be connected to client device 102 via network 104. Client device 102 can be pre-loaded with first application 302. First application 302 can download second application 304 from content management system 106. After downloading second application 304, second application 304 can be installed on client device 102. As described previously, this download and install can occur in the background, without notifying the user. First application 302 can then provide a token including sign in credentials to second application 304.

In some embodiments, first application 302 can contain second application 304. For example, downloading and installing second application 304 involves incorporating second application 304 within first application 302, e.g., inheriting the permissions and registration of first application 302.

Figure 4:
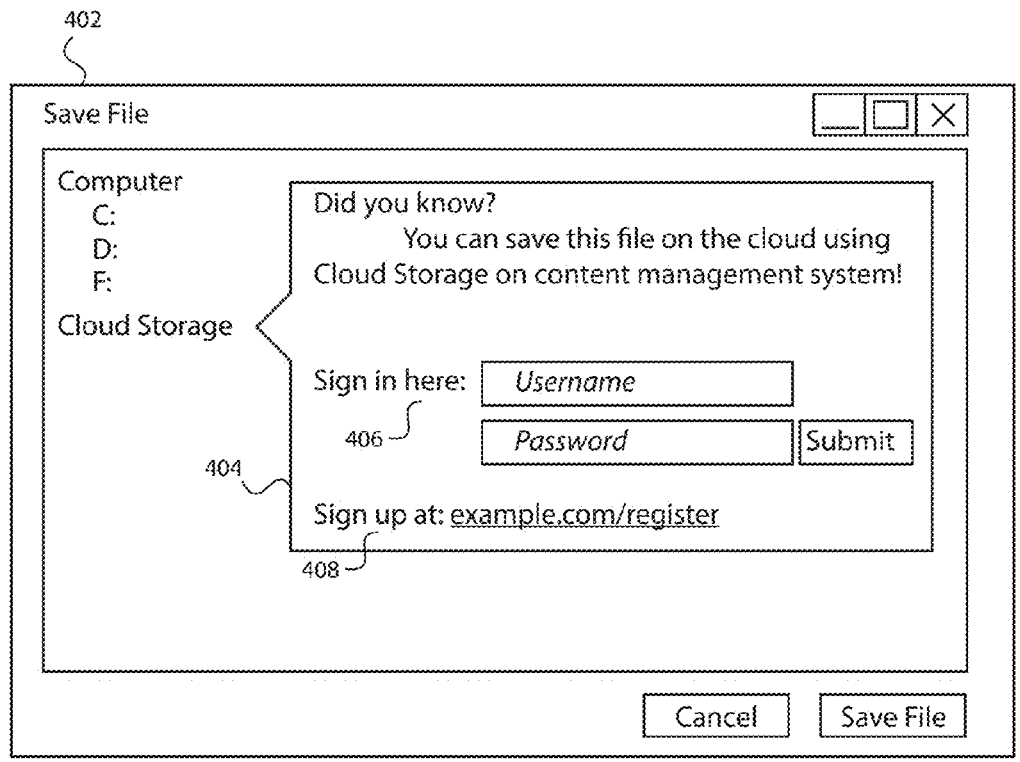
FIG. 4 shows an example user interface in accordance with various embodiments.

FIG. 4 shows an example user interface in accordance with various embodiments. For example, a "save file" dialog box 402 can be triggered by the user attempting to save a content item (e.g., a file) on the client device's 102 memory. This action of attempting to save a content item can be an example condition from step 202. Dialog box 402 can include prompt 404 that informs the user that the user can sign in and sign up for a service associated with content management system 106. The user can enter the user's credentials in sign in area 406 or register for the service by, for example, clicking link 408.

In some embodiments, a prompt can suggest an action that a user can do using the second application and, upon signing in or signing up for the service, the second application can automatically perform the selected action. For example, a user can indicate that they want to store a content item on content management system 106; the first application can then install the second application as described herein; once the second application is installed, the first application can instruct the second application to perform the action that the user indicated—e.g., storing the content item on content management system 106. Accordingly, any condition described in step 202 can be associated with an action that can be performed by the second application after installation. The first application can then perform the principles disclosed herein to provide a seamless initialization of the second application, giving the user the impression that the second application was fully preinstalled.

Figure 5:
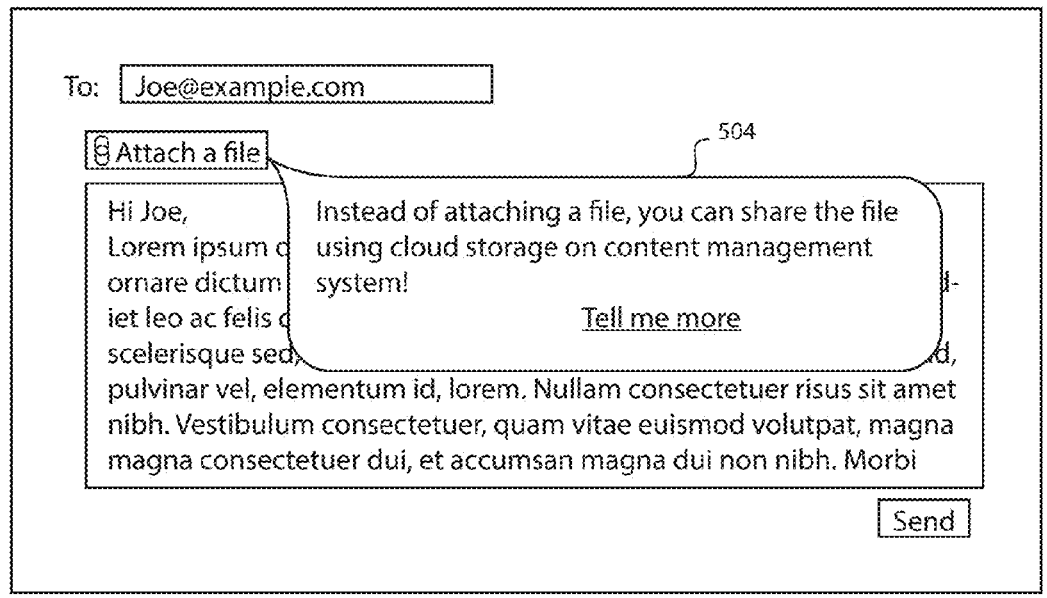
FIG. 5 shows an example user interface in accordance with various embodiments.

FIG. 5 shows an example user interface in accordance with various embodiments. In some embodiments, when a user has an opportunity to share a content item (e.g., attach the content item in an email), prompt 504 can invite the user to sign in and/or sign up for the service. In FIG. 5, the user can click "tell me more" to sign in or sign up for the service.

Figure 6:
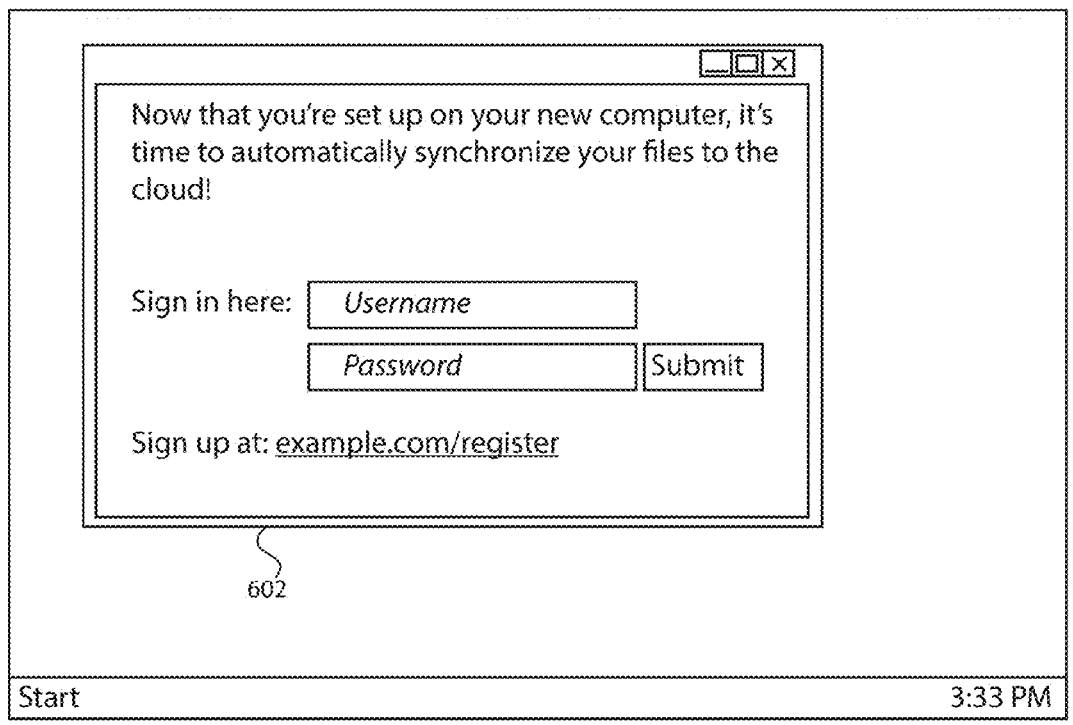
FIG. 6 shows an example user interface in accordance with various embodiments.

FIG. 6 shows an example user interface in accordance with various embodiments. Dialog box 602 can be presented to a user after a certain period of time. Dialog box 602 can invite the user to sign in or sign up for the service.

Figure 7:
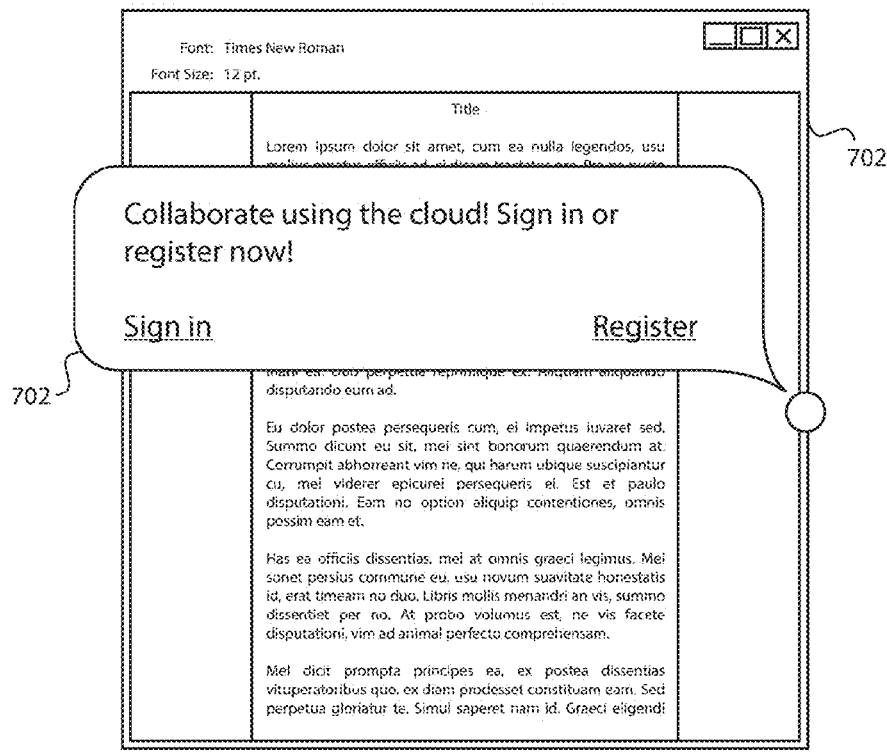
FIG. 7 shows an example user interface in accordance with various embodiments.

FIG. 7 shows an example user interface in accordance with various embodiments. For example a user can open a document in a text editor and the first application can present prompt 702 to the user inviting the user to sign in or register for the service to collaborate in producing the document using the cloud.

Figure 8A:
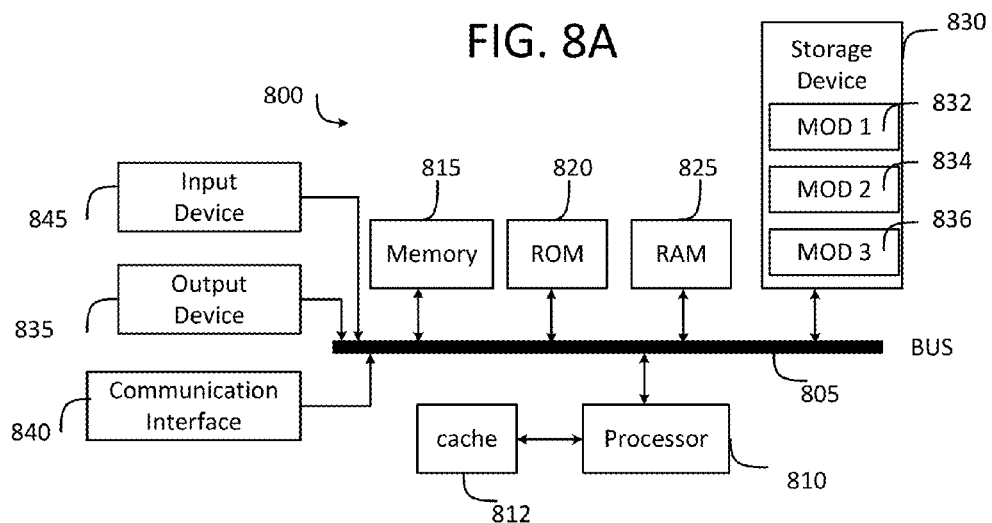
FIG. 8A shows an example possible system embodiment for implementing various embodiments of the present technology.
Figure 8B:
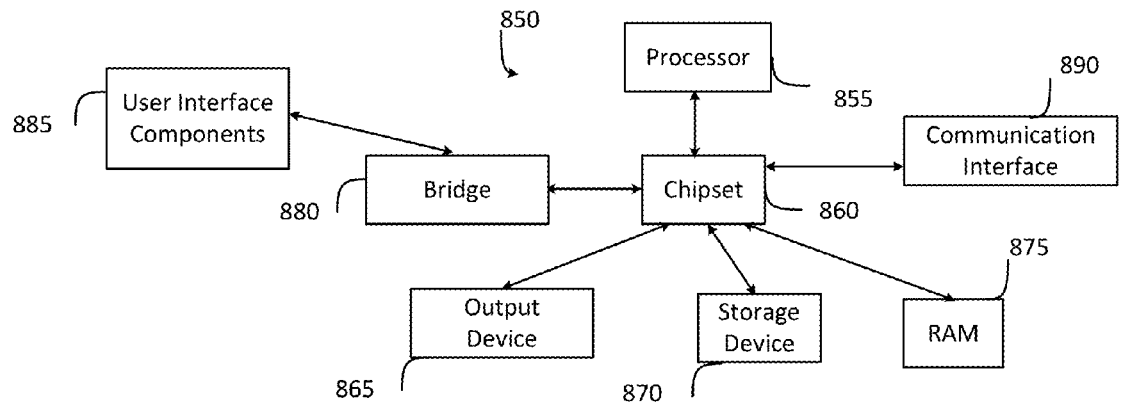
FIG. 8B shows an example possible system embodiment for implementing various embodiments of the present technology.

8A and FIG. 8B show example possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Example system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer-readable medium comprising: computer executable instructions stored thereon, the instructions when executed by a computer being effective to cause the computer to:

detect, by a first client application associated with a synchronized online content management system that comes preinstalled on the computer by an original equipment manufacturer, a condition that includes an initial computer boot up;

present, by the first client application, after the condition has been detected, an interface for signing in to or signing up for a service providing synchronization between the synchronized online content management system and a second client application associated with the synchronized online content management system on the computer;

receive, by the first client application, sign in credentials in the interface;

in response to receiving the sign in credentials, automatically download and install, by the first client application, the second client application, wherein the second client application synchronizes content items with the synchronized online content management system, wherein synchronization includes synchronizing changes in the content items between the second client application and the synchronized online content management system;

request, by the first client application from the second client application, a unique identifier for the second client application;

transmit, by the first client application to the synchronized online content management system, the unique identifier; and upon receiving verification of the unique identifier from the synchronized online content management system, pass a token from the first client application, including the received sign in credentials, to the second client application, the token being effective to automatically sign into the service by the second client application.

2. The non-transitory computer-readable medium of claim 1 wherein the second client application requires sign in credentials to run.

3. The non-transitory computer-readable medium of claim 1, further comprising after automatically signing into the service by the second client application, uninstall, by the second client application, the first client application.

4. The non-transitory computer-readable medium of claim 1 wherein the condition is a scheduled amount of time since the first client application has first launched.

5. The non-transitory computer-readable medium of claim 4 wherein the download of the second client application initiates in anticipation of the condition being detected.

6. The non-transitory computer-readable medium of claim 1 wherein the condition is detecting an event related to a content item manager.

7. The non-transitory computer-readable medium of claim 6 wherein the download of the second client application initiates after the condition has been detected.

8. The non-transitory computer-readable medium of claim 1 wherein the first client application has limited functionality that does not include functionality for providing the service on the computer.

9. A method comprising:

detecting, by a first client application associated with a synchronized online content management system that comes preinstalled on a computer by an original equipment manufacturer, a condition that includes an initial computer boot up;

presenting, by the first client application, after the condition has been detected, an interface for signing in to or signing up for a service providing synchronization between the synchronized online content management system and a second client application associated with the synchronized online content management system on the computer;

receiving, by the first client application, sign in credentials in the interface;

in response to receiving the sign in credentials, automatically downloading and installing, by the first client application, the second client application, wherein the second client application synchronizes content items with the synchronized online content management system and synchronization includes synchronizing changes in the content items between the second client application and the synchronized online content management system;

requesting, by the first client application from the second client application, a unique identifier for the second client application;

transmitting, by the first client application to the synchronized online content management system, the unique identifier; and upon receiving verification of the unique identifier from the synchronized online content management system, pass a token from the first client application, including the received sign in credentials, to the second client application, the token being effective to automatically sign into the service by the second client application.

10. The method of claim 9 wherein the second client application requires sign in credentials to run.

11. The method of claim 9 wherein the condition is a scheduled amount of time since the first client application has first launched.

12. The method of claim 11 wherein the downloading of the second client application initiates in anticipation of the condition being detected.

13. The method of claim 9 wherein the condition is detecting an event related to a content item manager.

14. The method of claim 13 wherein the downloading of the second client application initiates after the condition has been detected.

15. The method of claim 9 wherein the first client application has limited functionality that does not include functionality for providing the service on the computing device.

16. A system comprising:

a processor;

a computer-readable medium; and non-transitory computer-readable instructions, stored on the computer readable medium, that when executed by the processor, cause a computer to:

detect, by a first client application associated with a synchronized online content management system that comes preinstalled on the computer by an original equipment manufacturer, a condition that includes an initial computer boot up;

present, by the first client application, after the condition has been detected, an interface for signing in to or signing up for a service providing synchronization between the synchronized online content management system and a second client application associated with the synchronized online content management system on the computer;

receive, by the first client application, sign in credentials in the interface;

in response to receiving the sign in credentials, automatically download and install, by the first client application, the second client application, wherein the second client application synchronizes content items with the synchronized online content management system and synchronization includes synchronizing changes in the content items between the second client application and the synchronized online content management system;

requesting, by the first client application from the second client application, a unique identifier for the second client application;

transmitting, by the first client application to the synchronized online content management system, the unique identifier; and upon receiving verification of the unique identifier from the synchronized online content management system, pass a token from the first client application, including the received sign in credentials, to the second client application, the token being effective to automatically sign into the service by the second client application.

17. The system of claim 16 wherein the condition is detecting an event related to a content item manager.

18. The system of claim 17 wherein the download of the second client application initiates after the condition has been detected.

19. The non-transitory computer-readable medium of claim 1 further comprising:
   the automatic sign in to the service by the second client application includes signing in to a first user account and the content items are stored within the first user account at the synchronized online content management system and the second client application.

* * * * *